US009934020B2

(12) United States Patent
Aleksandrov et al.

(10) Patent No.: US 9,934,020 B2
(45) Date of Patent: Apr. 3, 2018

(54) INTELLIGENT MOBILE APPLICATION UPDATE

(71) Applicant: International Business Machines Corporation, Armonk, NY (US)

(72) Inventors: Anton Aleksandrov, Austin, TX (US); Girish Dhanakshirur, Bangalore (IN); Venkatakrishnan Sampath Kumaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/643,213

(22) Filed: Mar. 10, 2015

(65) Prior Publication Data

US 2016/0266885 A1 Sep. 15, 2016

(51) Int. Cl.
  *G06F 9/44* (2006.01)
  *G06F 9/445* (2018.01)

(52) U.S. Cl.
  CPC ..................................... *G06F 8/65* (2013.01)

(58) Field of Classification Search
  CPC ............... G06F 8/65; G06F 8/67; G06F 8/681
  See application file for complete search history.

(56) References Cited

U.S. PATENT DOCUMENTS

| | | | |
|---|---|---|---|
| 7,877,518 B2 | 1/2011 | Liu | |
| 8,316,088 B2 * | 11/2012 | Jalava | G06Q 10/10 370/255 |
| 8,364,137 B2 | 1/2013 | Chen et al. | |
| 8,463,884 B2 | 6/2013 | Clinton et al. | |
| 8,626,910 B1 * | 1/2014 | Lientz | H04L 41/0896 702/186 |
| 8,706,102 B2 | 4/2014 | Chen et al. | |
| 8,751,743 B2 | 6/2014 | Burge, III | |

(Continued)

FOREIGN PATENT DOCUMENTS

WO  2014123898 A1  8/2014

OTHER PUBLICATIONS

Android Developers, "Creating P2P Connections with Wi-Fi", Feb. 18, 2014, pp. 1-6.*

(Continued)

*Primary Examiner* — Duy Khuong T Nguyen
(74) *Attorney, Agent, or Firm* — Christopher McLane; Daniel R. Simek (57) ABSTRACT

In an approach for managing updates of a mobile software application, a computer receives information regarding a mobile computing device and a mobile software application on the mobile computing device, wherein the information regarding the mobile computing device comprises at least one or more of a location of the mobile computing device, a network connection type, a security bit associated with the mobile computing device, and a checksum associated with the at least one mobile software application. The computer determines whether the mobile software application matches a stored mobile software application on a computing device. Responsive to determining that the mobile software application does not match the stored mobile software application on the computing device, the computer determines an update policy for scheduling an update to the mobile software application on the mobile computing device.

9 Claims, 4 Drawing Sheets (56) References Cited

U.S. PATENT DOCUMENTS

| | | | |
|---|---|---|---|
| 2002/0100036 A1* | 7/2002 | Moshir | G06F 8/62 |
| | | | 717/173 |
| 2005/0222918 A1* | 10/2005 | Vanska | G06F 8/62 |
| | | | 455/419 |
| 2006/0130037 A1* | 6/2006 | Mackay | G06F 8/68 |
| | | | 717/168 |
| 2008/0130639 A1 | 6/2008 | Costa-Requena et al. | |
| 2008/0154805 A1* | 6/2008 | Gurumoorthy | G06F 9/505 |
| | | | 706/12 |
| 2009/0092139 A1* | 4/2009 | Coley | H04L 65/605 |
| | | | 370/395.4 |
| 2010/0125672 A1* | 5/2010 | Mobin | H04N 7/165 |
| | | | 709/231 |
| 2010/0251230 A1 | 9/2010 | O'Farrell et al. | |
| 2012/0023236 A1* | 1/2012 | Backholm | H04L 47/20 |
| | | | 709/226 |
| 2013/0219381 A1 | 8/2013 | Lovitt | |
| 2013/0344804 A1* | 12/2013 | Chen | H04B 5/02 |
| | | | 455/41.1 |
| 2014/0075567 A1* | 3/2014 | Raleigh | H04W 12/10 |
| | | | 726/26 |
| 2016/0266890 A1 | 9/2016 | Aleksandrov et al. | |
| 2016/0308907 A1* | 10/2016 | Le | H04L 12/4641 |

OTHER PUBLICATIONS

Android Developers, "Sharing Files With NFC", Mar. 29, 2014, p. 1.*
List of IBM Patents or Patent Applications Treated as Related, Appendix P, Filed Herewith.
Anton Aleksandrov, et al., "Intelligent Mobile Application Update", U.S. Appl. No. 14/847,134, filed Sep. 8, 2015.
"IBM Worklight Foundation V6.3 delivers a platform for developing and managing a rich, mobile, device-specific experience", IBM United States Software Announcement 214-368, dated Oct. 1, 2014.
Appendix P, List of IBM Patents or Patent Applications Treated as Related, 2 pages, dated Sep. 21, 2017.

\* cited by examiner

INTELLIGENT MOBILE APPLICATION UPDATE

STATEMENT ON PRIOR DISCLOSURES BY AN INVENTOR

Various aspects of the present invention have been disclosed in the products IBM Worklight Foundation V6.3, made publicly available on Oct. 1, 2014. The following disclosure(s) are submitted under 35 U.S.C. 102(b)(1)(A) as prior disclosures by, or on behalf of, a sole inventor of the present application or a joint inventor of the present application. The following documentation is provided in support of the disclosure available on Oct. 1, 2014:

(i) IBM Worklight Foundation V6.3 delivers platform for developing and managing a rich, mobile, device-specific experience, IBM United States Software Announcement 214-368, Oct. 1, 2014.

BACKGROUND OF THE INVENTION

The present invention relates generally to the field of software applications, and more particularly to managing updates of mobile software applications.

Users of mobile computing devices install mobile software applications to enable the mobile devices to perform a variety of tasks. Mobile applications were initially geared towards general productivity and information retrieval (e.g., e-mail, calendar, weather, etc.) but have expanded into other categories, such as entertainment and mobile commerce (e.g., games, banking, online purchases, etc.). Mobile applications are available for purchase by a user through application distribution platforms, such as application stores that are operated by the owner of the mobile operating system. Mobile applications are also available to users for installation over a content delivery network (CDN). CDNs are large distributed systems of content servers deployed in multiple data centers across the Internet to serve content to end-users with high availability and high performance that content providers pay to have delivered to end-users.

For a mobile computing device to install and/or update mobile applications from the application store or CDN, the mobile computing device connects to the Internet (e.g., mobile broadband, wireless personal area network (WPAN), tethering, peer to peer (P2P), etc.). Mobile broadband delivers wireless Internet through mobile phone towers to mobile computing devices and other digital devices using portable modems. WPAN is a network for interconnecting devices centered on the workspace of an individual person when within range of the network, in which the connections are wireless. Tethering connects one device to another through WPAN, piconet, or a physical connection and allows the sharing of the Internet connection (e.g., mobile hotspot). A piconet is a small network composed of up to as many as eight active devices in a master-slave relationship. P2P is a network in which interconnected nodes share resources simultaneously functioning as both clients and servers to the other nodes on the network. Once a connection to the Internet is established, the mobile software application downloads to the mobile computing device.

SUMMARY

Aspects of the present invention disclose a method, computer program product, and system for managing updates of a mobile software application. The method includes one or more computer processors receiving information regarding a mobile computing device and a mobile software application on the mobile computing device, wherein the information regarding the mobile computing device comprises at least one or more of a location of the mobile computing device, a network connection type, a security bit associated with the mobile computing device, and a checksum associated with the at least one mobile software application. The method further includes one or more computer processors determining whether the mobile software application matches a stored mobile software application on a computing device. Responsive to determining that the mobile software application does not match the stored mobile software application on the computing device, the method further includes one or more computer processors determining an update policy for scheduling an update to the mobile software application on the mobile computing device.

DETAILED DESCRIPTION

Developers of mobile software applications often update previous versions of mobile software applications to incorporate improvements and/or implement fixes for errors. When a mobile computing device connects over the Internet to an application distribution platform, the updated version replaces the previous versions of mobile software applications on the mobile computing device. Depending upon the distribution of the mobile software application, the application distribution platform may be overwhelmed by the volume of requests, thus resulting in an inability to efficiently process the updates. Embodiments of the present invention recognize that efficiently and smartly managing the deployment of an updated version of mobile application software limits the possibility to overwhelm the application distribution platform and delivers an updated version to the user in a timely manner. Embodiments of the present invention evaluate parameters of the mobile computing device of a user with respect to the formulation and dispatch of a policy to schedule when, where, and what update will be applied. Additional embodiments of the present invention update mobile applications and adjust the schedule when changes occur that impact the policy.

Figure 1:
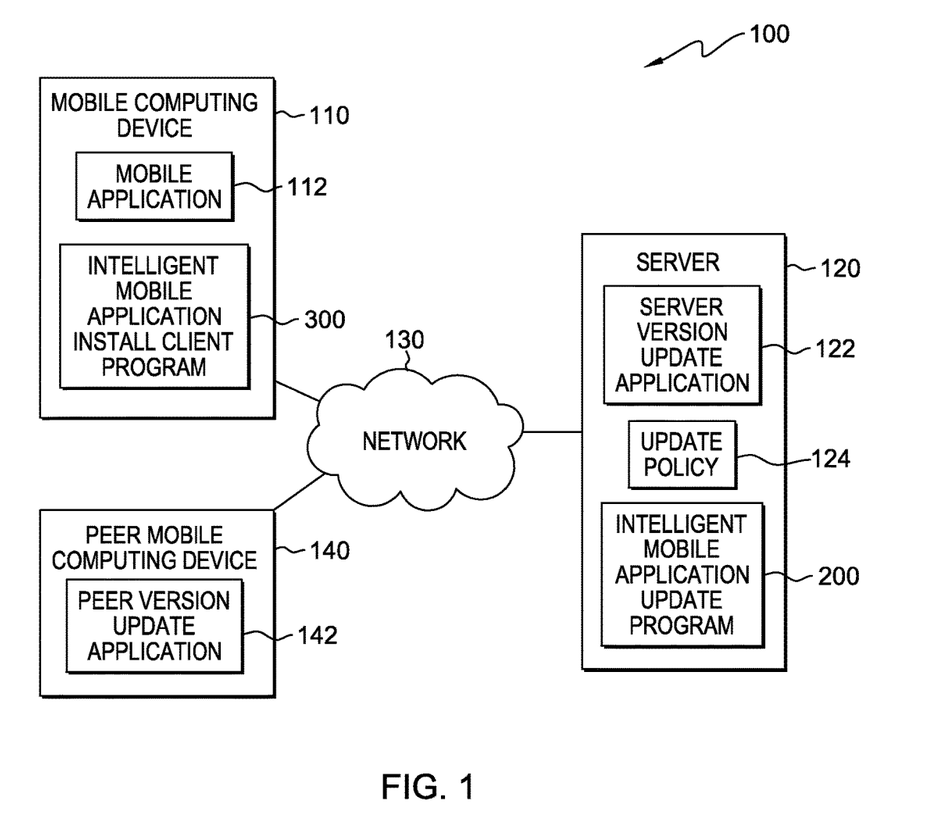
FIG. 1 is a functional block diagram illustrating a mobile computing environment, in accordance with an embodiment of the present invention.

The present invention will now be described in detail with reference to the Figures. FIG. 1 is a functional block diagram illustrating a mobile computing environment, generally designated 100, in accordance with one embodiment of the present invention. FIG. 1 provides only an illustration of one embodiment and does not imply any limitations with regard to the environments in which different embodiments may be implemented.

In the depicted embodiment, mobile computing environment 100 includes mobile computing device 110, peer mobile computing device 140, and server 120 interconnected over network 130. Mobile computing environment 100 may include additional computing devices, mobile computing devices, servers, computers, storage devices, or other devices not shown.

Mobile computing device 110 and peer mobile computing device 140 may be a laptop computer, a netbook computer, a tablet computer, an ultrabook computer, a personal digital assistant (PDA), a smart phone, a cell phone, a phone pad, an e-reading device, a media player, or a mobile gaming device. In general, mobile computing device 110 and peer mobile computing device 140 may be an electronic device or a computing system capable of sending and receiving data and communicating with server 120 or another mobile computing device (e.g., mobile computing device 110 communicates with peer mobile computing device 140 and the converse) over network 130. Mobile computing device 110 includes mobile application 112 and intelligent mobile application install client program 300. Peer mobile computing device 140 includes peer version update application 142.

Mobile application 112 and peer version update application 142 represent an installed application and the associated application software on mobile computing device 110 and peer mobile computing device 140 respectively. Server version update application 122 represents an installable application and the associated application software for a mobile computing device, such as mobile computing device 110 and peer mobile computing device 140 that is stored on server 120. In one embodiment, mobile application 112, peer version update application 142, and server version update application 122 are the same version of application software. In the depicted embodiment, mobile application 112 is a different version of application software than peer version update application 142 and server version update application 122. For example, mobile application 112 is the initial factory installed application software, and peer version update application 142 and server version update application 122 are identical updated versions of the factory installed application software. In some other embodiment, mobile application 112, peer version update application 142, and server version update application 122 may all be different versions of application software. For example, mobile application 112 is the initial factory installed application software, peer version update application 142 is an updated version implementing a critical software fix, and server version update application 122 is another updated version incorporating both improvements and the critical software fix.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with mobile computing device 110 and peer mobile computing device 140 over network 130. In other embodiments, server 120 may represent a server computing system utilizing multiple computers as a server system, such as in a cloud computing environment. Server 120 contains server version update application 122, update policy 124, and intelligent mobile application update program 200.

Update policy 124 is a file created by intelligent mobile application update program 200 to establish the parameters to govern the update of a mobile application, such as mobile application 112 on mobile computing device 110. In the depicted embodiment, update policy 124 resides on server 120. In another embodiment, update policy 124 may reside on another server or computing device (not shown) connected over network 130 provided that update policy 124 is accessible by intelligent mobile application update program 200 and intelligent mobile application install client program 300.

Network 130 may be a local area network (LAN), a wide area network (WAN), such as the Internet, a wireless local area network (WLAN), any combination thereof, or any combination of connections and protocols that will support communications between mobile computing device 110, peer mobile computing device 140, server 120, and other computing devices and servers (not shown), in accordance with embodiments of the inventions. Network 130 may include wired, wireless, or fiber optic connections. Network 130 may also include mobile broadband. Mobile broadband refers to wireless Internet access delivered through mobile phone towers to computing devices, mobile computing devices, and other digital devices through portable modems via a mobile network operator (e.g., wireless service provider, wireless carrier, mobile network carrier, etc.).

Intelligent mobile application update program 200 is a software program that manages the updates for mobile application software when updates are available for mobile computing devices, such as mobile computing device 110 and peer mobile computing device 140. Intelligent mobile application update program 200 determines when an outdated version of application software is installed, the appropriate version of application software to install, a location to acquire the update from, and schedules the installation of the update based on information received from intelligent mobile application install client program 300 and creates update policy 124 (e.g., embeds the determined information within update policy 124). Intelligent mobile application update program 200 then provides intelligent mobile application install client program 300 with update policy 124. In the depicted embodiment, intelligent mobile application update program 200 resides on server 120. In some other embodiment, intelligent mobile application update program 200 may reside on another server or computing device (not shown) connected over network 130 provided intelligent mobile application update program 200 is accessible to mobile application 112, intelligent mobile application install client program 300, and peer mobile computing device 140.

Intelligent mobile application install client program 300 is a software program that updates mobile application software, such as mobile application 112 based on update policy 124. Additionally, intelligent mobile application install client program 300 provides information pertaining to mobile computing device 110 to intelligent mobile application update program 200 to facilitate in the creation of update policy 124. In the depicted embodiment, intelligent mobile application install client program 300 resides on mobile computing device 110. In another embodiment, intelligent mobile application install client program 300 may also reside on peer mobile computing device 140. In some other embodiment, intelligent mobile application install client program 300 may reside on another server or computing device (not shown) connected over network 130 provided intelligent mobile application install client program 300 is accessible to mobile application 112 and intelligent mobile application update program 200.

Figure 2:
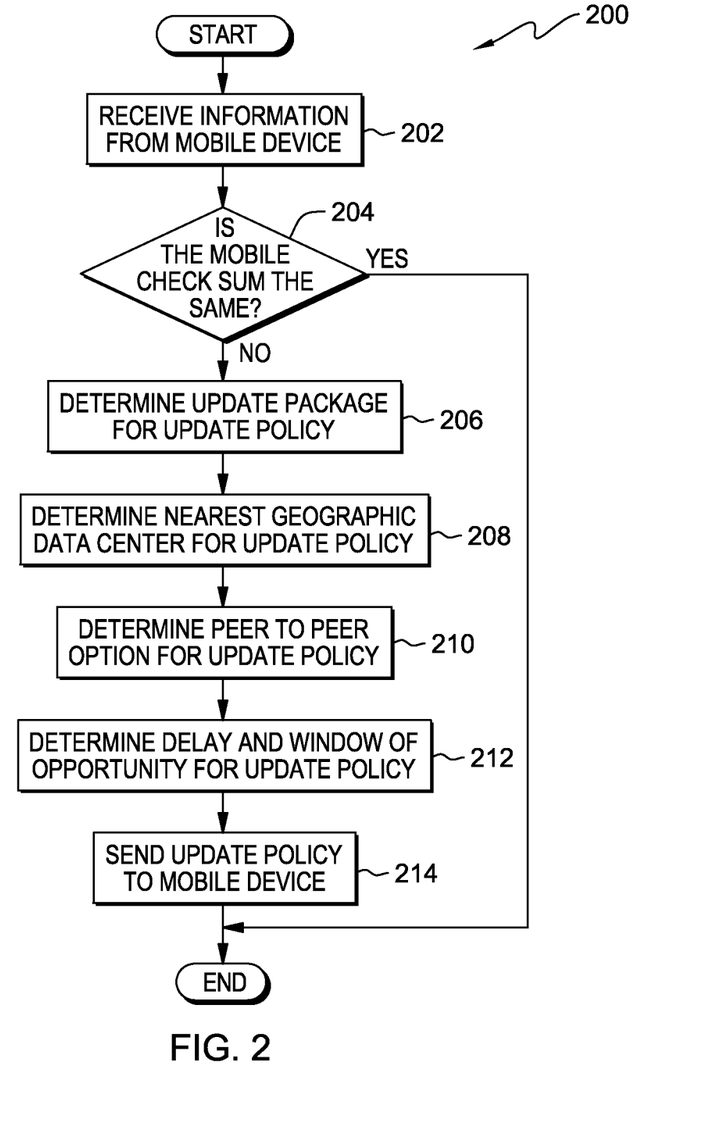
FIG. 2 is a flowchart depicting operational steps of an intelligent mobile application update program, on a server within the mobile computing environment of FIG. 1, for managing the updating of application software on a mobile computing device, in accordance with an embodiment of the present invention.

FIG. 2 is a flowchart depicting operational steps of intelligent mobile application update program 200, a program for managing the updating of application software on a mobile computing device, in accordance with an embodiment of the present invention. Prior to intelligent mobile application update program 200 initiating, mobile computing device 110 establishes a connection to network 130 and in addition, intelligent mobile application install client program 300 is running on mobile computing device 110. A user on mobile computing device 110 then initiates mobile application 112, and intelligent mobile application install client program 300 sends information regarding mobile computing device 110 and mobile application 112 to intelligent mobile application update program 200.

In step 202, intelligent mobile application update program 200 receives information from intelligent mobile application install client program 300 and initiates. Information from intelligent mobile application install client program 300 includes location, checksum, network type, and security bit status pertaining to mobile computing device 110 and mobile application 112. In one embodiment, intelligent mobile application update program 200 receives location information as global positioning system (GPS) coordinates provided by a GPS chip within mobile computing device 110. In another embodiment, intelligent mobile application update program 200 receives an approximate location of mobile computing device 110 based on triangulation. Triangulation is the process of determining the location of mobile computing device 110 by measuring the radial distance, or the direction, of the received time delay (equates to a distance) between mobile computing device 110 and two or three different mobile phone towers. Intelligent mobile application update program 200 then calculates the approximate location of mobile computing device 110 to be at the point of intersection of the resultant circles. In some other embodiment, intelligent mobile application update program 200 receives an approximate location through receipt of a unique identifier over a piconet connection that is then identified over the Internet and includes corresponding location information.

Intelligent mobile application update program 200 receives a checksum associated with mobile application 112. A checksum is the outcome of running an algorithm, referred to as a cryptographic hash function, on a piece of data, usually a single file, such as mobile application 112. The resulting checksum is a small sized datum generated for the purpose of error checking (i.e., comparison of the checksum for two files verifies whether the two files are the same). Intelligent mobile application update program 200 receives the network type associated with network 130 that mobile computing device 110 connects to (e.g., WPAN, 3G, 4G, etc.). Additionally, intelligent mobile application update program 200 receives information pertaining to the security features set on mobile computing device 110 (e.g., security bit set to true or false).

In decision 204, intelligent mobile application update program 200 determines whether the checksum associated with mobile application 112 is the same as the checksum associated with server version update application 122. Intelligent mobile application update program 200 compares the received checksum associated with mobile application 112 with the stored checksum associated with server version update application 122. If intelligent mobile application update program 200 determines the checksums are the same (decision 204, yes branch), then intelligent mobile application update program 200 completes. If intelligent mobile application update program 200 determines the checksums are different (decision 204, no branch), then intelligent mobile application update program 200 determines an update package for update policy 124 (step 206) and initiates creation of update policy 124. For example, mobile application 112 is the factory installed application software, and server version update application 122 is a new version that includes updates and a critical fix. The checksum for mobile application 112 is not the same as the checksum for server version update application 122, indicating mobile application 112 is not the latest version of the application software. In another embodiment, intelligent mobile application update program 200 may determine whether mobile application 112 is the same as server version update application 122 by comparing the version numbers associated with both software applications. In some other embodiment, intelligent mobile application update program 200 may determine whether mobile application 112 is the same as server version update application 122 by comparing release dates.

In step 206, intelligent mobile application update program 200 determines a software application update package for update policy 124. Intelligent mobile application update program 200 determines the software application update package (e.g., version of software) based on the data rate of the connection between mobile computing device 110 and network 130. For example, when mobile computing device 110 is connected to network 130 over mobile broadband through a second generation (2G) connection with data rates of 9.6 Kbps to 237 Kbps, intelligent mobile application update program 200 may select a reduced software application update package including only critical fixes. However, when mobile computing device 110 is connected to WPAN with data rates between 56 Mbps to 128 Mbps, intelligent mobile application update program 200 may select a full software application update package including improvements and critical fixes.

In step 208, intelligent mobile application update program 200 determines the nearest geographic data center of the CDN that serves update requests for update policy 124. In one embodiment, intelligent mobile application update program 200 determines the nearest geographic data center of the CDN. For example, mobile computing device 110 is located within the United States in Boston, with CDNs located in New York, Philadelphia, Washington D.C., and Atlanta. Intelligent mobile application update program 200 therefore selects the New York CDN as New York is the closest geographically to Boston. In another embodiment, intelligent mobile application update program 200 may determine the nearest geographic location of the CDN with the ability to serve the update request. For example, there are two CDN locations approximately the same distance from mobile computing device 110 based on a triangulated location. Intelligent mobile application update program 200 determines which of the two CDNs has greater available bandwidth to service the request. In some other embodiment, intelligent mobile application update program 200 receives a selection of a CDN from the user from a list of available CDN locations. For example, while mobile computing device 110 may be located in New York, the preferred CDN assigned to the company is in New Jersey. Intelligent mobile application update program 200 displays a list of available CDNs to the user of mobile computing device 110. The user may then select the CDN assigned to the company in New Jersey over the closer CDN location in New York.

In step 210, intelligent mobile application update program 200 determines a peer to peer option for update policy 124. Intelligent mobile application update program 200 checks the status of the secured bit as received in step 202. In one embodiment, the secured bit is set to true and intelligent mobile application update program 200 sets update policy 124 to not search for available peer to peer connections (e.g., security bit is enabled for mobile computing device 110 and peer to peer connections are not allowed). In another embodiment, the secured bit is set to false and intelligent mobile application update program 200 sets update policy 124 to search for available peer to peer connections (e.g., security bit is not enabled for mobile computing device 110 and peer to peer connections are allowed). Intelligent mobile application update program 200 sets the determined peer to peer option within update policy 124.

In step 212, intelligent mobile application update program 200 determines a delay and window of opportunity for update policy 124. In one embodiment, intelligent mobile application update program 200 may determine the delay as a computed random time delay that facilitates the distribution of requests over a time period for a CDN location by balancing and optimizing the workload to ensure mobile computing devices, such as mobile computing device 110, receive an update in a timely manner (e.g., assists in keeping connections of one type from receiving the same delay that may result in an overload of the CDN when a high volume of requests occur within a similar time frame). For example, a delay is determined to be an hour, and the current time is one o'clock. The delay changes the start time of the download to be two o'clock (i.e., the start time associated with a download is offset by the amount of the determined delay). Intelligent mobile application update program 200 may determine the delay as a calculation incorporating a random number, number of users, size of server version update application 122, protocol overhead, and bandwidth of the CDN location. Bandwidth is the bit rate of available or consumed information capacity expressed in metric multiples of bits per second. Bandwidth defines the net bit rate, channel capacity, or the maximum throughput of a communication path in a digital communication system (i.e., the average rate of successful data transfer through a communications path). The protocol overhead refers to the metadata and network routing information sent by an application, which uses a portion of the available bandwidth but does not contribute to the content of the message. In another embodiment, intelligent mobile application update program 200 may determine the delay based on additional factors (e.g., priority list, criticality of the update, etc.) that also distributes the requests. In addition, intelligent mobile application update program 200 determines a window of opportunity for the download to occur within (e.g., amount of time within which the download should be able to complete based on the file size and the data rate of the connection, duration of the download). Intelligent mobile application update program 200 utilizes the window of opportunity to aid in the distribution of an update to mobile computing devices, such as mobile computing device 110 that are waiting for an update (e.g., provide a means to continue movement through the queue). For example, by using the size of the file and the speed of the data rate connection, intelligent mobile application update program 200 may determine an overall time for the update to complete. Intelligent mobile application update program 200 may use the overall time as an offset to add to the delay to assist in the distribution of requests. In another example, while a user maintains the same connection type, the data rate of the connection may vary (e.g., slow down or speed up) which impacts the time to download and presents a risk to the ability of other mobile computing devices to download the update. The time limit presented by the window of opportunity provides a mechanism to postpone one download and begin another download to continue movement within the queue.

In step 214, intelligent mobile application update program 200 sends update policy 124 to intelligent mobile application install client program 300 over network 130. Update policy 124 includes the software application update package (e.g., version of software to update mobile application 112 to, such as server version update application 122), CDN location, and delay. Intelligent mobile application install client program 300 initiates upon receipt of update policy 124.

Figure 3:
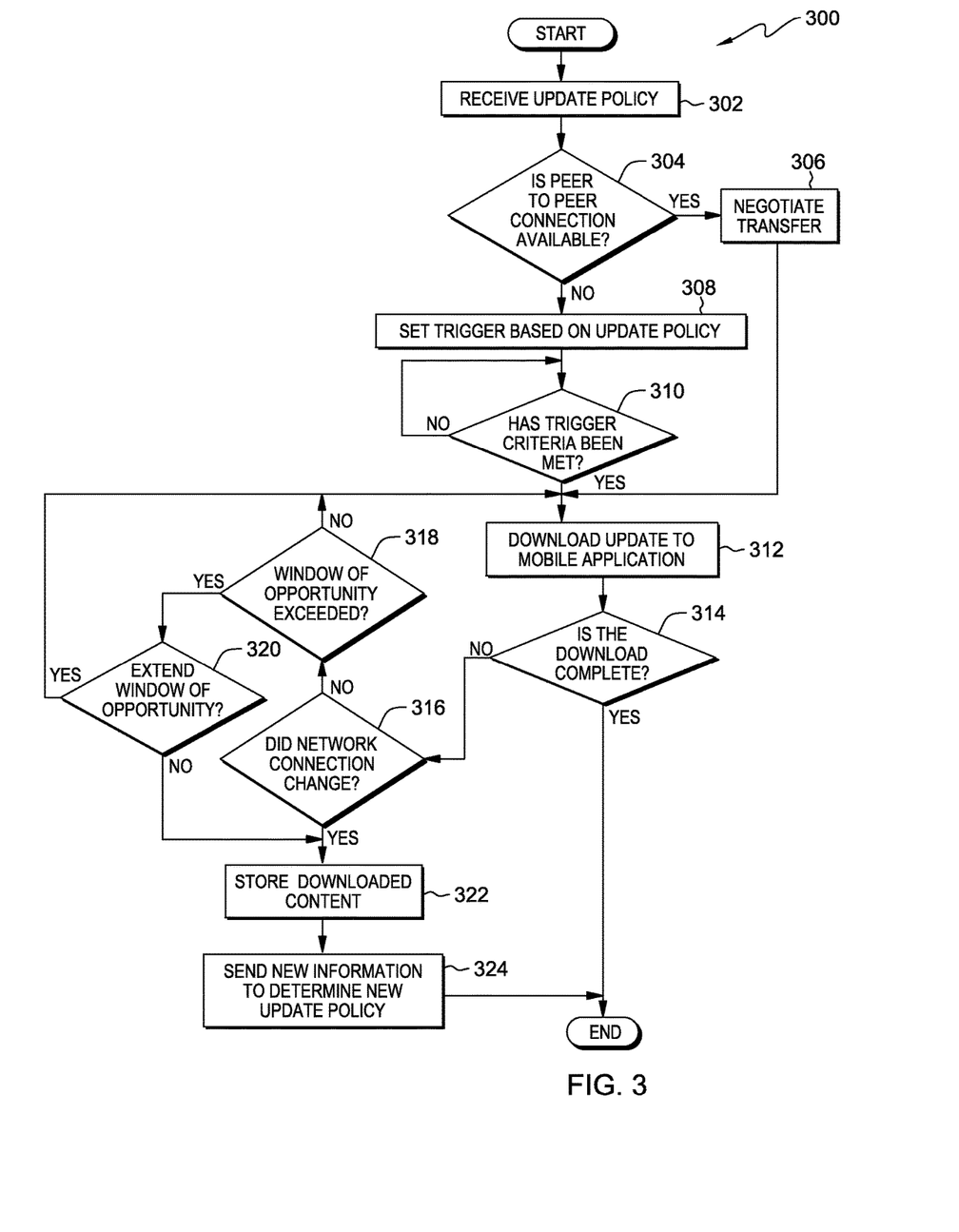
FIG. 3 is a flowchart depicting operational steps of an intelligent mobile application install client program, on a mobile computing device within the mobile computing environment of FIG. 1, for updating the application software on the mobile computing device, in accordance with an embodiment of the present invention.

FIG. 3 is a flowchart depicting operational steps of intelligent mobile application install client program 300, a program for updating application software on a mobile computing device, in accordance with an embodiment of the present invention.

In step 302, intelligent mobile application install client program 300 receives update policy 124 from intelligent mobile application update program 200. Intelligent mobile application update program 200 receives update policy 124 within a push notification (i.e., server initiated transmission). Intelligent mobile application install client program 300 then initiates the installation of an update to mobile application 112 based on the information within update policy 124.

In decision 304, intelligent mobile application install client program 300 determines whether a peer to peer connection is available. Intelligent mobile application install client program 300 determines whether a peer to peer connection is available when the security bit is set to false (e.g., update policy 124 includes option for updates to occur through peer to peer connections (step 210)). Peer to peer connections occur when nodes share resources, such as processing power, disk storage, network bandwidth, and files amongst other nodes without the use of a centralized administrative system. Intelligent mobile application install client 300 searches available peer connections for the software application update package as identified in update policy 124. For example, mobile computing device 110 allows peer to peer connections. Intelligent mobile application install client program 300 searches for peer connections and determines peer mobile computing device 140 is an available peer connection. Intelligent mobile application install client program 300 further determines peer mobile computing device 140 includes peer version update application 142 (e.g., software application update package noted within update policy 124).

If intelligent mobile application install client program 300 determines a peer to peer connection is available (decision 304, yes branch), then intelligent mobile application install client program 300 negotiates a transfer (step 306). If intelligent mobile application install client program 300 determines a peer to peer connection is not available (decision 304, no branch), then intelligent mobile application install client program 300 sets a trigger based on update policy 124 (step 308).

In step 306, intelligent mobile application install client program 300 negotiates a transfer of peer version update application 142. Intelligent mobile application install client program 300 establishes a file transfer protocol over network 130 between mobile computing device 110 and peer mobile computing device 140. Once intelligent mobile application install client program 300 establishes the file transfer protocol, intelligent mobile application install client program 300 downloads the update to mobile application 112 from peer mobile computing device 140 (e.g., peer version update application 142) (step 312).

In step 308, intelligent mobile application install client program 300 sets a trigger based on update policy 124 (e.g., delay set within update policy 124). The trigger is a process that initiates an action when an event occurs (e.g., initiates the download of an update when the conditions of the delay are met). In one embodiment, the delay is negligible (e.g., update policy 124 indicates delay is not needed), and intelligent mobile application install client program 300 sets the trigger for immediate download from the CDN location. In another embodiment, intelligent mobile application install client program 300 sets a trigger with a date and time rule (e.g., delay is not negligible). Intelligent mobile application install client program 300 sets the trigger for a specified data and time to distribute the load on the CDNs (i.e., only allows a set number of mobile devices to connect to the CDNs at one time in order to mitigate an overload of the CDN). For example, intelligent mobile application install client program 300 sets a trigger similar to an event, such as "today at 5 pm" for the download of server version update application 122 to mobile computing device 110. Intelligent mobile application install client program 300 stores update policy 124 until the trigger criteria are met.

In decision 310, intelligent mobile application install client program 300 determines whether trigger criteria are met. Intelligent mobile application install client program 300 utilizes functions of mobile computing device 110, such as the calendar and clock to determine whether the trigger criteria are met. If intelligent mobile application install client program 300 determines the trigger criteria are met (decision 310, yes branch), then intelligent mobile application install client program 300 begins the download of server version update application 122 based on update policy 124. If intelligent mobile application install client program 300 determines trigger criteria are not met (decision 310, no branch), then intelligent mobile application install client program 300 returns to wait for the trigger criteria to be met (decision 310). For example, the trigger is today at 5 pm and while criteria for the day is met, the actual time from the clock is 4 pm; therefore, intelligent mobile application install client program 300 determines the trigger is not met and returns to wait for the trigger criteria to be met at 5 pm.

In step 312, intelligent mobile application install client program 300 downloads the update to mobile application 112. In one embodiment, intelligent mobile application install client program 300 begins a new download (e.g., first time an update to mobile application 112 is available and connects to download). In another embodiment, intelligent mobile application install client program 300 resumes a previous download (e.g., initial download did not complete and a partial download was stored to continue the download at another time). In one embodiment, intelligent mobile application install client program 300 connects to the CDN over network 130 (e.g., connects to the CDN identified in update policy 124). Intelligent mobile application install client program 300 downloads server version update application 122 based on the data rate of the connection with the CDN. In another embodiment, intelligent mobile application install client program 300 connects to peer mobile computing device 140 over network 130. Intelligent mobile application install client program 300 downloads peer version update application 142. In one embodiment, intelligent mobile application install client program 300 continues to download the update (e.g., server version update application 122, peer version update application 142) while update policy 124 is valid (e.g., window of opportunity is not exceeded). In another embodiment, intelligent mobile application install client program 300 continues to download the update after intelligent mobile application install client program 300 successfully negotiates an extension to update policy 124 (e.g., window of opportunity is extended).

In decision 314, intelligent mobile application install client program 300 determines whether the download is complete. When intelligent mobile application install client program 300 begins the download of server version update application 122, a time to completion (i.e., time taken for the download to complete) is associated with the download that relates to the size of the file and the rate of the data connection. In one embodiment, intelligent mobile application install client program 300 tracks a percentage complete for the download. In another embodiment, intelligent mobile application install client program 300 tracks an estimated time remaining to complete the download. In some other embodiment, intelligent mobile application install client program 300 tracks a combination of percentage complete and time remaining to complete the download.

If intelligent mobile application install client program 300 determines the download is complete (decision 314, yes branch), then intelligent mobile application install client program 300 completes (e.g., mobile computing device 110 includes the latest version of application software). If intelligent mobile application install client program 300 determines the download is not complete (decision 314, no branch), then intelligent mobile application install client program 300 determines whether the network connection changed (decision 316).

In decision 316, intelligent mobile application install client program 300 determines whether the network connection changed. In one embodiment, intelligent mobile application install client program 300 does not detect a change in the network connection. For example, the user of mobile computing device 110 is at home, and mobile computing device 110 remains connected to network 130 over WPAN. In another embodiment, intelligent mobile application install client program 300 detects a change in the network connection (e.g., CDN location update, peer to peer network update, transitions from CDN to peer to peer, transitions from peer to peer to CDN, data rate connection update, etc.). If intelligent mobile application install client program 300 determines the network did not change (decision 316, no branch), then intelligent mobile application install client program 300 determines whether the window of opportunity exceeds update policy 124 (decision 318). In another example, the user of mobile computing device 110 is riding in a car, and mobile computing device 110 transfers from a 4G phone tower to a 3G phone tower (i.e., results in a change in the network connection). If intelligent mobile application install client program 300 determines network 130 did change (decision 316, yes branch), then intelligent mobile application install client program 300 stores the content downloaded prior to the connection change of network 130 (step 322).

In decision 318, intelligent mobile application install client program 300 determines whether the window of opportunity exceeds update policy 124. Intelligent mobile application install client program 300 compares the calculated window of opportunity with the actual download time (i.e., determines whether the download completes within the set time). If intelligent mobile application install client program 300 determines the actual download time exceeds the window of opportunity (decision 318, yes branch), then intelligent mobile application install client program 300 determines whether the window of opportunity can be extended (decision 320). If intelligent mobile application install client program 300 determines the actual download time does not exceed the window of opportunity (decision 318, no branch), then intelligent mobile application install client program 300 continues the download of server version update application 122 or peer version update application 142 (step 312).

In decision 320, intelligent mobile application install client program 300 determines whether the window of opportunity can be extended. Intelligent mobile application install client program 300 performs a handshake with the CDN, server 120, or peer mobile computing device 140. A handshake is an automated negotiation process that takes place between computing devices to negotiate parameters that are acceptable at both ends of the communication channel for an information transfer (i.e., series of messages sent and received between devices verifying the connection, data rate, and authorization to agree on a communications protocol). If intelligent mobile application install client program 300 determines the window of opportunity can be extended (decision 320, yes branch), then intelligent mobile application install client program 300 extends the window of opportunity with a command (e.g., negotiated within the handshake) and continues to download the update to mobile application 112 (step 312). For example, intelligent mobile application install client program 300 determines the CDN can serve the request (e.g., CDN is not a maximum capacity); therefore, the extension is granted and the download continues. If intelligent mobile application install client program 300 determines the window of opportunity cannot be extended (decision 320, no branch), then intelligent mobile application install client program 300 stores content downloaded (step 322). For example, intelligent mobile application install client program 300 determines the resources with peer mobile computing device 140 are no longer available and stores the content until a time when the download may resume.

In step 322, intelligent mobile application install client program 300 stores the downloaded content (i.e., portion of server version update application 122). Intelligent mobile application install client program 300 stores the content in order to potentially shorten the remaining download time once the download is able to resume. In one embodiment, intelligent mobile application install client program 300 stores the downloaded content prior to a change in the connection to network 130. For example, during the download the connection to network 130 is lost. Intelligent mobile application install client program 300 stores the downloaded content up to the point the connection was lost. When mobile computing device 110 re-establishes a connection with network 130, the previous portion of data downloaded remains on mobile computing device 110, the download resumes at that point, and intelligent mobile application install client program 300 downloads the remaining portion of server version update application 122. In another embodiment, intelligent mobile application install client program 300 stores the content downloaded prior to exceeding the window of opportunity set within update policy 124.

In step 324, intelligent mobile application install client program 300 sends the new information to intelligent mobile application update program 200 to determine a new update policy 124. For example due to a network connection change, intelligent mobile application install client program 300 re-sends the location, the checksum, the security bit status, and the updated network type of the 3G that intelligent mobile application update program 200 receives (step 202). Intelligent mobile application install client program 300 does not resume until intelligent mobile application update program 200 determines a new update policy 124. Intelligent mobile application install client program 300 continues the download of server version update application 122 based on new update policy 124.

Figure 4:
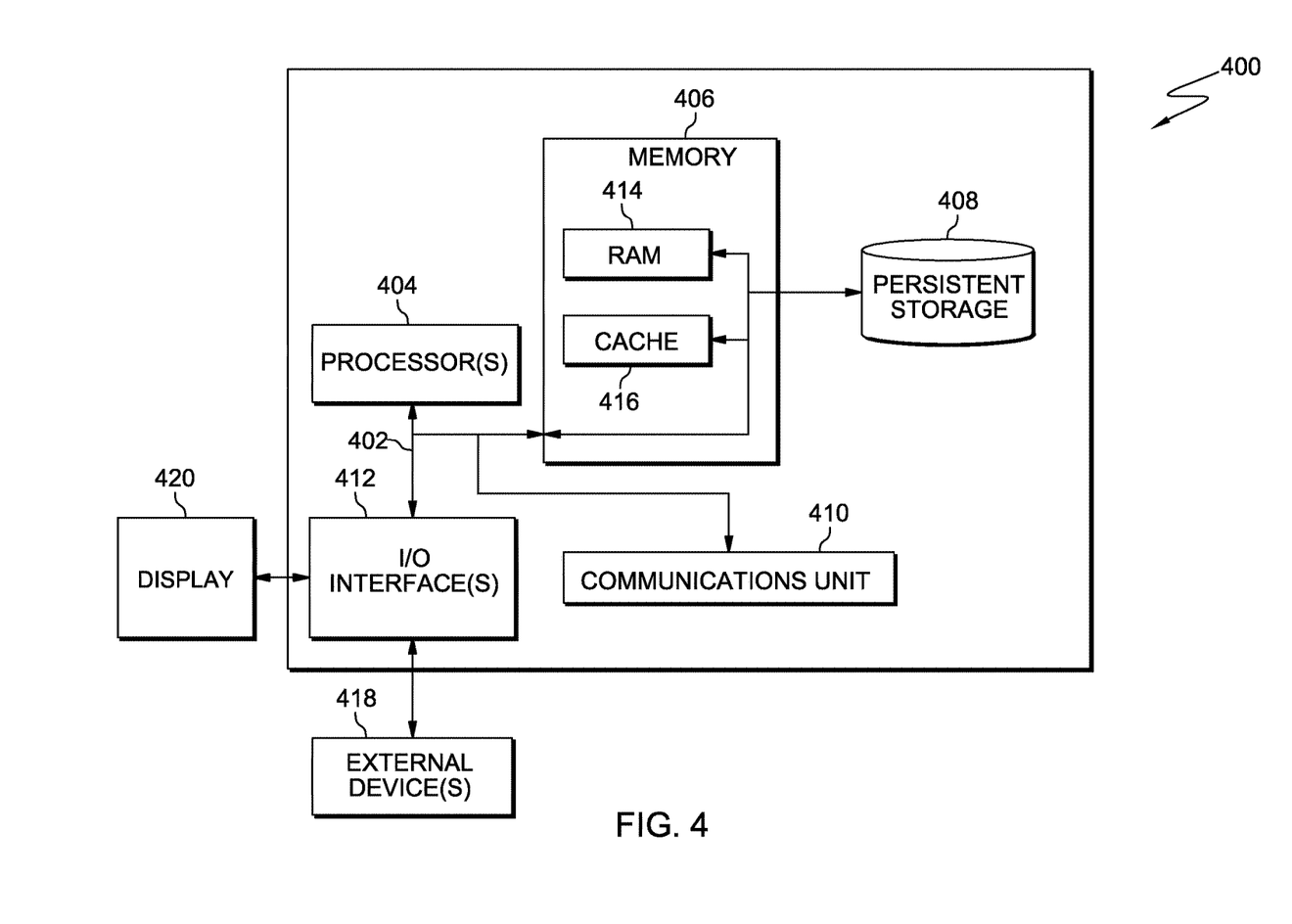
FIG. 4 is a block diagram of components of the server executing the intelligent mobile application update program, in accordance with an embodiment of the present invention.

FIG. 4 depicts a block diagram of components of server 400, which is representative of server 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Mobile application 112, server version update application 122, update policy 124, peer version update application 142, intelligent mobile application update program 200, and intelligent mobile application install client program 300 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of enterprise grid and client devices. In these examples, communications unit 410 includes one or more network interface cards. Communications unit 410 may provide communications through the use of either or both physical and wireless communications links. Mobile application 112, server version update application 122, update policy 124, peer version update application 142, intelligent mobile application update program 200, and intelligent mobile application install client program 300 may be downloaded to persistent storage 408 through communications unit 410.

I/O interface(s) 412 allows for input and output of data with other devices that may be connected to server 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., mobile application 112, server version update application 122, update policy 124, peer version update application 142, intelligent mobile application update program 200, and intelligent mobile application install client program 300, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for managing updates of a mobile software application, the computer program product comprising:
    one or more computer readable storage media and program instructions stored on the one or more computer readable storage media, the program instructions comprising:
    program instructions to receive information regarding a mobile computing device and a mobile software application on the mobile computing device, wherein the information regarding the mobile computing device comprises: a security bit associated with the mobile computing device wherein a status of the security bit on the mobile computing device is set to enable a peer to peer connection over a network, a geographic location of the mobile computing device as determined through triangulation, a network connection type, and a checksum associated with the at least one mobile software application;
    program instructions to determine whether the mobile software application matches a stored mobile software application on a computing device;
    responsive to determining that the mobile software application does not match the stored mobile software application on the computing device, program instructions to determine an update policy for scheduling an update to the mobile software application on the mobile computing device, wherein the update policy establishes parameters to govern the update of the mobile software application, wherein the parameters include a software application update package, a nearest geographic data center, a peer to peer option, a delay, and a window of opportunity;
    program instructions to send the update policy to the mobile computing device;
    program instructions to set a trigger based on a delay that provides a start time associated with the update policy, wherein the trigger sets a date and time rule to initiate a download of the software application;
    program instructions to determine the trigger occurs;
    program instructions to initiate the download of the software application update package to the mobile computing device;
    program instructions to determine whether the initiated download completes;
    responsive to determining the download does not complete, determine whether the network connection of the mobile computing device changes;
    responsive to determining the network connection did not change, program instructions to determine whether the window of opportunity indicating a maximum duration of time to complete the download of the software application update package is exceeded;
    responsive to determining the window of opportunity indicating a maximum duration of time to complete a download of the software application update package is exceeded, program instructions to determine whether to extend the window of opportunity for the mobile computing device; and
    responsive to determining to extend the window of opportunity for the mobile computing device, program instructions to send a command to extend the window of opportunity to the mobile computing device.

2. The computer program product of claim 1, wherein determining the update policy for scheduling an update to the mobile software application on the mobile computing device, further comprises program instructions, stored on the one or more computer readable storage media, to:
    determine the software application update package based on a data rate of the network connection type, wherein the determined software application update package is one software application update package selected from a group consisting of: a reduced software application package that includes critical fixes and a full software application package that includes improvements and critical fixes; and
    determine the delay that provides a start time associated with scheduling the update to the mobile software application on the mobile computing device, wherein the delay is a calculation balancing and optimizing a workload incorporating a random number, a number of users, a size of the determined software application update package, a protocol overhead, and a bandwidth of the determined location.

3. The computer program product of claim 2 further comprising program instructions, stored on the one or more computer readable storage media for execution by at least one of the one or more processors, to:
    determine a location to receive the software application update package from, wherein the location to receive the software application update package from includes one or more of: a nearest geographic data center of a content delivery network location and a peer to peer network option; and
    determine the window of opportunity for indicating a maximum duration of time to complete a download of the software application update package based on a file size of the determined software application update package and the data rate of the connection with the determined location to receive the software application update package from.

4. The computer program product of claim 1, further comprising program instructions, stored on the one or more computer readable storage media, to:

responsive to determining the initiated download does not complete, determine whether the network connection of the mobile computing device changes;

responsive to determining the network connection changes, store content associated with a completed portion of the initiated download;

receive updated information regarding the mobile computing device;

determine an update to the update policy based on the received updated information; and send the determined update to the update policy to the mobile computing device.

5. The computer program product of claim 1, further comprising program instructions, stored on the one or more computer readable storage media, to:

responsive to determining the window of opportunity is not extended, store content associated with a completed portion of the initiated download;

receive updated information regarding the mobile computing device;

determine an update to the update policy based on the received updated information; and send the determined update to the update policy to the mobile computing device.

6. A computer system for managing updates of a mobile software application, the computer system comprising:

one or more computer processors, one or more computer readable storage media, and program instructions stored on the computer readable storage media for execution by at least one of the one or more processors, the program instructions comprising:

program instructions to receive information regarding a mobile computing device and a mobile software application on the mobile computing device, wherein the information regarding the mobile computing device comprises: a security bit associated with the mobile computing device wherein a status of the security bit on the mobile computing device is set to enable a peer to peer connection over a network, a geographic location of the mobile computing device as determined through triangulation, a network connection type, and a checksum associated with the at least one mobile software application;

program instructions to determine whether the mobile software application matches a stored mobile software application on a computing device;

responsive to determining that the mobile software application does not match the stored mobile software application on the computing device, program instructions to determine an update policy for scheduling an update to the mobile software application on the mobile computing device, wherein the update policy establishes parameters to govern the update of the mobile software application, wherein the parameters include a software application update package, a nearest geographic data center, a peer to peer option, a delay, and a window of opportunity;

program instructions to send the update policy to the mobile computing device;

program instructions to set a trigger based on a delay that provides a start time associated with the update policy, wherein the trigger sets a date and time rule to initiate a download of the software application;

program instructions to determine the trigger occurs;

program instructions to initiate the download of the software application update package to the mobile computing device;

program instructions to determine whether the initiated download completes;

responsive to determining the download does not complete, program instructions to determine whether the network connection of the mobile computing device changes;

responsive to determining the network connection did not change, program instructions to determine whether the window of opportunity indicating a maximum duration of time to complete the download of the software application update package is exceeded;

responsive to determining the window of opportunity indicating a maximum duration of time to complete a download of the software application update package is exceeded, program instructions to determine whether to extend the window of opportunity for the mobile computing device; and responsive to determining to extend the window of opportunity for the mobile computing device, program instructions to send a command to extend the window of opportunity to the mobile computing device.

7. The computer system of claim 6, wherein determining the update policy for scheduling an update to the mobile software application on the mobile computing device, further comprises program instructions, stored on the one or more computer readable storage media for execution by at least one of the one or more processors, to:

determine the software application update package based on a data rate of the network connection type, wherein the determined software application update package is one software application update package selected from a group consisting of: a reduced software application package that includes critical fixes and a full software application package that includes improvements and critical fixes; and determine the delay that provides a start time associated with scheduling the update to the mobile software application on the mobile computing device, wherein the delay is a calculation balancing and optimizing a workload incorporating a random number, a number of users, a size of the determined software application update package, a protocol overhead, and a bandwidth of the determined location.

8. The computer system of claim 7 further comprising stored on the one or more computer readable storage media for execution by at least one of the one or more processors, to:

determine a location to receive the software application update package from, wherein the location to receive the software application update package from includes one or more of: a nearest geographic data center of a content delivery network location and a peer to peer network option; and determine the window of opportunity for indicating a maximum duration of time to complete a download of the software application update package based on a file size of the determined software application update package and the data rate of the connection with the determined location to receive the software application update package from.

9. The computer system of claim 6, further comprising program instructions, stored on the one or more computer readable storage media for execution by at least one of the one or more processors, to:

responsive to determining the initiated download does not complete, determine whether the network connection of the mobile computing device changes;

responsive to determining the network connection changes, store content associated with a completed portion of the initiated download;

receive updated information regarding the mobile computing device;

determine an update to the update policy based on the received updated information; and send the determined update to the update policy to the mobile computing device.

* * * * *